(No Model.)

E. W. UPTON.
THERMOSTAT.

No. 358,511. Patented Mar. 1, 1887.

Witnesses.
John P. L. Prinkert
Fred L. Emery

Inventor
Edgar W. Upton
by Crosby & Gregory attys.

UNITED STATES PATENT OFFICE.

EDGAR W. UPTON, OF PEABODY, MASSACHUSETTS.

THERMOSTAT.

SPECIFICATION forming part of Letters Patent No. 358,511, dated March 1, 1887.

Application filed April 30, 1886. Serial No. 200,659. (No model.)

*To all whom it may concern:*

Be it known that I, EDGAR W. UPTON, of Peabody, county of Essex, and State of Massachusetts, have invented an Improvement in Thermostats, of which the following description, in connection with the accompanying drawings, is a specification, like letters on the drawings representing like parts.

This invention relates to thermostats to indicate variations in temperature, and has for its object to produce a thermostat which shall be cheap and simple in construction, yet sure and reliable in operation.

My improved thermostat is especially adapted to be used in an electric circuit to indicate at one point a change in temperature at another point.

My invention consists, essentially, of a shell or case open at both ends, a laminated helical coil, composed, preferably, of metal of unequal rates of expansion by heat, the said laminated helical coil being located in said shell or case, combined with one or more contact-pieces co-operating with the said laminated helical coil, to render effective an electric circuit to indicate at one point a variation in temperature at the point where the thermostat is located, all as hereinafter particularly set forth and claimed.

Figure 1:
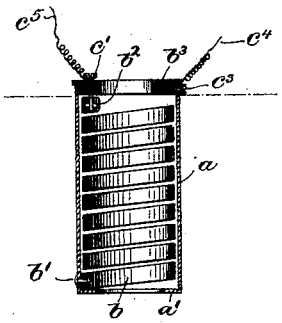
Figure 2:
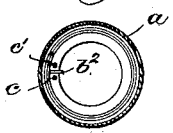

Figure 1 is a sectional elevation of a thermostat produced in accordance with my invention; Fig. 2, a sectional view of Fig. 1 on line $x.x$, looking down; and Fig. 3, a side elevation of the cap removed.

Referring to the drawings, $a$ represents a shell or case, preferably cylindrical in form. The shell or case $a$ is open at both ends and provided with a flange, $a'$, at its bottom.

The shell or case $a$ contains within it a preferably helical coil, $b$, composed of two laminæ of metal having different rates of expansion by heat—such, for instance, as brass and iron or steel. The helical coil $b$, as herein shown, is extended down to or rests upon the flange $a'$, and, as herein shown, is firmly secured to the case $a$ by rivet $b'$, the upper end of said helical coil being free to elongate and contract, according as the temperature rises or falls.

The free end of the spring $b$ is bent to form a finger, $b^2$, said finger being radially disposed with relation to the path of movement of the said spring.

The shell or case $a$ is, as herein shown, provided at its upper end with a cap or cover, $b^3$, preferably adjustable thereon and provided with a central opening corresponding with the opening in the bottom of the said shell or case, said openings permitting of a free circulation of air through the said case or shell, thereby allowing an instantaneous action of heat upon the spring $b$, thus rendering the instrument exceedingly sensitive to the slightest variation in temperature.

Figure 3:

The cap or cover $b^3$, as herein shown, has extended through it two contact-pieces, $c\ c'$, (shown as screws,) provided, preferably, with platinum tips $c^2$, as indicated by heavy black portions, Figs. 1 and 3.

The cap $b^3$ is herein shown as secured in position by screw $c^3$, inserted through the shell or case $a$, and having electrically connected to it a circuit-wire, $c^4$, the other circuit-wire, $c^5$, being electrically connected to the screws $c\ c'$, the said circuit containing an alarm or other signaling device, which is located in a central or other office.

The contact-piece $c$, as herein shown, is so located with relation to the finger $b^2$ that the said finger will meet the said contact-piece to close the circuit and thereby give an alarm at a central station or other desired place when the temperature has risen to a certain predetermined point. The contact-piece $c'$ is likewise arranged in the path of movement of the finger $b^2$, so that the circuit will be closed to give an alarm when the temperature has fallen to a predetermined point.

In operation the thermostat will be placed in the room or locality wherein it is desired to know when the temperature arises at a certain predetermined point, and the said thermostat will be so placed as to permit a free circulation of air through it. When the finger $b^2$ comes in contact with either contact-piece $c\ c'$, the circuit of the instrument will be closed, said circuit being traced from the wire $c^4$ through the shell or case $a$, helical coil $b$, and contact-piece, either $c$ or $c'$, to the wire $c^5$.

The cap or cover $b^3$ can be turned to place the contact-pieces in any desired position with relation to the finger $b^2$, so that different instruments may operate at different degrees of temperature.

I claim—

1. A thermostatic instrument composed of a shell or case open at both ends to permit the free passage of air therethrough, a laminated helical coil located in said case and provided with an inwardly-projecting finger, combined with one or more contact-pieces co-operating with the said laminated helical coil to render effective an electric circuit to give an alarm when the temperature has reached a predetermined point, substantially as described.

2. The shell A, open at its bottom, the spring $b$, its attached finger $b^2$, combined with the cap or cover $b^3$, provided with an opening to permit a free passage through the shell A, and with the contact-pieces $c\ c'$, as and for the purposes set forth.

In testimony whereof I have signed my name to this specification in the presence of two subscribing witnesses.

EDGAR W. UPTON.

Witnesses:
G. W. GREGORY,
J. H. CHURCHILL.